(12) United States Patent
Potze et al.

(10) Patent No.: US 8,403,479 B2
(45) Date of Patent: *Mar. 26, 2013

(54) CONTACT LENS EYE MODEL

(75) Inventors: Willem Potze, Geldrop (NL); Steven Ernest Franklin, Eindhoven (NL); Kees Hendriks, Eindhoven (NL); Jose L. Perez, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/641,182

(22) Filed: Dec. 17, 2009

(65) Prior Publication Data

US 2011/0153287 A1    Jun. 23, 2011

(51) Int. Cl.
*G02C 7/00* (2006.01)

(52) U.S. Cl. ............. 351/159.77; 351/159.73

(58) Field of Classification Search .......... 351/177, 351/246, 200, 159.73, 159.74, 159.77
See application file for complete search history.

(56) References Cited

U.S. PATENT DOCUMENTS

| | | | |
|---|---|---|---|
| 4,268,133 A | 5/1981 | Fischer et al. | |
| 4,874,234 A | 10/1989 | Wichterle | |
| 5,057,578 A | 10/1991 | Spinelli | |
| 5,314,960 A | 5/1994 | Spinelli et al. | |
| 5,371,147 A | 12/1994 | Spinelli et al. | |
| 5,540,410 A | 7/1996 | Lust et al. | |
| 5,652,638 A | 7/1997 | Roffman et al. | |
| 5,760,870 A | 6/1998 | Payor et al. | |
| 5,805,260 A | 9/1998 | Roffman et al. | |
| 5,912,719 A | 6/1999 | Baude et al. | |
| 6,183,082 B1 | 2/2001 | Clutterbuck | |
| 6,305,802 B1 | 10/2001 | Roffman et al. | |
| 6,467,903 B1 | 10/2002 | Back | |
| 6,554,425 B1 | 4/2003 | Roffman et al. | |
| 6,988,800 B2 | 1/2006 | Chou et al. | |
| 7,475,883 B2 | 1/2009 | Christophel et al. | |
| 7,475,983 B2 | 1/2009 | Ye et al. | |
| 7,801,039 B2 | 9/2010 | Monette et al. | |
| 2005/0041202 A1 | 2/2005 | Jubin et al. | |
| 2005/0237482 A1 | 10/2005 | Jubin et al. | |
| 2006/0055884 A1 | 3/2006 | Molinari et al. | |
| 2008/0055545 A1 | 3/2008 | Clamp | |
| 2008/0079895 A1* | 4/2008 | Jubin et al. | 351/177 |
| 2009/0225273 A1 | 9/2009 | Clutterbuck et al. | |

(Continued)

FOREIGN PATENT DOCUMENTS

EP    0866354 A1    9/1998
WO    0175509 A1    10/2001

(Continued)

OTHER PUBLICATIONS

Effect of tear additives on the sheer stress and normal stress acting on the ocular surface, MB Jones, GR Fulford, CP Please, LS McElwain and MJ Collins, 16th Australasian Fluid Mechanics Conference, Dec. 2-7, 2007.*

(Continued)

*Primary Examiner* — James Greece (57) ABSTRACT

A model for testing contact lens designs is used in applications such as methods for designing contact lenses in which one subjects a lens design to the model, determines whether the lens meets its design objectives by application of the model, keeps the lens design if it does, and modifies the lens design if it does not.

1 Claim, 4 Drawing Sheets

U.S. PATENT DOCUMENTS

| | | |
|---|---|---|
| 2011/0149231 A1 | 6/2011 | Gerligand et al. |
| 2011/0149232 A1 | 6/2011 | Gerligand |
| 2011/0149233 A1 | 6/2011 | Gerligand |
| 2011/0153287 A1 | 6/2011 | Potze et al. |

FOREIGN PATENT DOCUMENTS

| | | |
|---|---|---|
| WO | WO 2004/010204 A1 | 1/2004 |
| WO | 2004097502 A1 | 11/2004 |

OTHER PUBLICATIONS

H.D. Conway, The Motion of a Contact Lens over the Eye During Blinking, 1982, American Journal of Optometry and Physiological Optics, vol. 59, No. 10, pp. 770-773.*

Henry A. Knoll and H.D.Conway, Analysis of Blink-Induced Vertical Motion of Contact Lenses, Jul. 2, 1986 Annula Meeting of the American Academy of optometry.*

Written Opinion international Preliminary Report on Patentability for PCT/2010 061004 Date of Mailing Mar. 31, 2011.

Grant, Ross, "Mechanics of Toric Soft Lens Stabilization", Journal of the British Contact Lens Association, Elsevier, NL., vol. 9, No. Supplement 1, Jan. 1, 1986. pp. 44-47 XP007917345.

U.S. Appl. No. 12/641,058, filed Dec, 17, 2009; Entitled: Contact Lenses With Stabilization Features; Inventors: Pierre Gerligand et al.; Assignee: Johnson & Johnson Vision Care, Inc.

U.S. Appl. No. 12/641,089, filed Dec. 17, 2009; Entitled: Stabilization of Contact Lenses ; Inventors: Edgar Menezes et al.; Assignee: Johnson & Johnson Vision Care, Inc.

U.S. Appl. No. 12/641,116, filed Dec. 17, 2009; Entitled: Method for Stabilizating Contact Lenses ; Inventors: Pierre Gerligand et al.; Assignee: Johnson & Johnson Vision Care, Inc.

U.S. Appl. No. 12/641,144, filed Dec. 17, 2009, Entitled: Stabilized Contact Lenses; Inventor: Pierre Gerligand; Assignee: Johnson & Johnson Vision Care, Inc.

U.S. Appl. No. 12/641,166, filed Dec. 17, 2009, Entitled: Method for Producing Stabilized Contact Lenses; Inventor: Pierre Gerligand; Assignee: Johnson & Johnson Vision Care, Inc.

U.S. Appl. No. 12/641,058, and Office Actions: Dec. 14, 2010; May 2, 2012.

U.S. Appl. No. 12/641,089, and Office Actions: Apr. 25, 2011; Oct. 28, 2011 and attachment; Feb. 13, 2012; Jun. 5, 2012.

U.S. Appl. No. 12/641,116, and Office Actions: Mar. 1, 2012; Jul. 26, 2012.

U.S. Appl. No. 12/641,144 and Office Actions: Nov. 9, 2011; Mar. 21, 2012; Aug. 1, 2012.

U.S. Appl. No. 12/641,166, and Office Actions: Dec. 29, 2010; May 18, 2011; Aug. 22, 2011 and attachment; Nov. 17, 2011; Apr. 4, 2012; Jun. 14, 2012; Aug. 7, 2012 and attachment.

* cited by examiner

Lens material properties
- rho [kg/m^3]; density
- E [N/m^2]; Young's modulus
- nu [-]; Poisson's ratio Eyelid and blink properties
- Xlower [m]; lower eyelid lateral displacement
- Xupper [m]; upper eyelid lateral displacement
- Tdownblink [s]; time to complete downward motion upper eyelid
- Tblink [s]; time to complete blink
- Tinterblink [s]; time between one blink and the next one
- p [N/m^2]; eyelid pressure
- y0low [m]; lower eyelid position at start of blink
- y0upp [m]; upper eyelid position at start of blink
- y0wp [m]; width pressure band at upper eyelid edge
- phi_0low [deg]; angle lower eyelid at start of blink
- phi_0upp [deg]; angle upper eyelid at start of blink
- ivelocity [-]; =1/2: velocity eyelids constant / matching experiments

FIG. 7

CONTACT LENS EYE MODEL

BACKGROUND OF THE INVENTION

Current methods for designing contact lenses are typically laborious, time consuming and expensive. They typically involve creating a lens design on a computer using either commercially available or internally developed software. The parameters inputted into the software include prescription information, ocular dimensions, tear film properties and material properties. Lenses of the created design must then be manufactured and then clinically tested to determine how they will fit and move on the patient's eye. If the lenses are found wanting, the whole process must be repeated until acceptable on-eye performance is achieved. This design, build, test cycle is necessary since on-eye performance could not otherwise be predicted. Designing, manufacturing, prescribing and fitting contact lenses can benefit from understanding the dynamics of the eye. How the eye moves, the forces that interact in such movement, and the way lenses are affected by the movement and the forces can be important. For example, devising stabilization schemes for retaining a lens in a location or range of locations on the eye can be enhanced by such an understanding.

It would be even more useful if the forces and interactions relating to an eye and lens would be caste into a model that could demonstrate the effect on proposed designs. That is the subject of the instant invention.

SUMMARY OF THE INVENTION

The invention is a model for testing contact lens designs. In another aspect of the invention, a method for designing contact lenses includes proposing a design, subjecting the design to the model, determining whether the lens meets its design objectives, keeping the lens design if it does, and modifying the lens design if it does not.

In another aspect of the invention, device for testing lens designs includes a computer programmed with an eye model.

In yet another aspect of the invention, the eye model acts by balancing the moment of momentum of torques acting on the lens on-eye.

DETAILED DESCRIPTION

The eye model of the invention has particularly useful application in a design process that balances torques operating on the eye and in components of the eye. This can include design improvement processes that start with a nominal design. Subjecting that design to the eye model and determining whether design objectives are met. Such processes include, without limitation, designing spherical, toric, multifocal, astigmatic, aspheric, and hybrid lenses.

The model that is preferably used in the process to produce the new designs incorporates various factors and assumptions that simulate the mechanical operation and their effects on lens stability. Preferably, this model is reduced to software using standard programming and coding techniques according to well-known programming techniques. In broad overview, the model is used in the process for designing stabilized lenses by simulating the application of the forces described below in a prescribed number of blinks of the eye. The degree to which the lens rotates and decenters is determined accordingly. The design is then altered in a way that is directed to bringing rotation and/or centration to more desirable levels. It is then subjected to the model again to determine translation upon blinking after the pre-determined number of blinks. The alteration of the design is accomplished by the application of merit functions described in more detail below.

The model assumes that the eye preferably consists of at least two spherical surface parts representing the cornea and the sclera and that the origin of the x-y-z coordinate axes is in the center of the sphere representing the cornea. More complex surfaces such as aspheric surfaces may also be used. The base shape of the lens consists of spherical surface parts but the base curve radius of the lens is allowed to change from the center of the lens towards the edge. More than one base curve may be used to describe the back surface. It is assumed that a lens positioned on the eye assumes the same shape as that of the eye. The thickness distribution of the lens need not necessarily be rotationally symmetric. Thick zones at the edge of the lens may be used to control the position and orientation behavior of the lens. A uniform thin film of liquid (tear film) exists between the lens and the eye, with a typical thickness of between 1 and 7 µm, preferably 5 µm. This tear film is referred to as the post-lens tear film. At the lens edge the thickness of the liquid film between the lens and eye is much smaller and is referred to as the mucin tear film. A uniform thin film of liquid (also, tear film) with a typical thickness of between 1 and 10 µm, preferably 5.0 µm exists between the lens and the lower and upper eyelids and these are referred to as the pre-lens tear films. The boundaries of both the lower and the upper eyelids lie in planes having unit normal vectors in the x-y plane. Hence, the projections of these boundaries on the plane perpendicular to the z-axis are straight lines. This assumption is also made during the motion of the eyelids. The upper eyelid exerts a uniform pressure on the contact lens. This uniform pressure is exerted on the whole area of the contact lens covered by the upper eyelid or on a part of this area near the boundary of the upper eyelid with uniform width (measured in the direction perpendicular to the plane through the curve describing the edge of the eyelid). The lower eyelid exerts a uniform pressure on the contact lens. This pressure is exerted on the whole area of the contact lens covered by the lower eyelid. The pressure exerted by the eyelids on the contact lens contributes to the torque acting at the lens through a non-uniform thickness distribution (thick zone) of the contact lens, especially near the edge. The effect of this pressure on the torques acting at the contact lens is referred to as the melon seed effect. Viscous friction exists in the post-lens tear film if the lens moves with respect to the eye. Viscous friction also exists in the mucin tear film between lens edge and the eye if the lens moves with respect to the eye. Additionally, viscous friction exists in the pre-lens tear film if the lens moves and/or the eyelids move. Strains and stresses in the lens occur due to the deformation of the lens. These strains and stresses result in an elastic energy content of the lens. As the lens moves with respect to the eye and the deformation of the lens changes, the elastic energy content changes. The lens tends toward a position at which the elastic energy content is minimal.

The motion of a lens on an eye is decomposed into a rotation around the "centerline" of the lens and a rotation around a line in the x-y plane. The rotation around the "centerline" is called the rotation of the lens. The rotation around a line in the x-y plane causes a decentration of the lens. The motion of the "top point" of the lens is the decentration motion of the lens. When the eyelids move, for instance during a blink, shearing in the tear films occurs and therefore shear stresses act at the lens. The three degrees of freedom of the lens are determined by the balance of moment of momentum. The lens positions and orientates itself such that the balance of moment of momentum is satisfied. The mechanisms described above cause a contribution to the total torque acting at the lens. The torques acting at the lens can be divided into torques driving and into torques resisting a motion of the lens. The torques proportional with the (rotation) velocity of the lens are classified as torques resisting the motion of the lens. All other torques are classified as torques driving the motion of the lens. The contributions to the total torque acting at the lens are time-dependent during a blink; also the position and the orientation of the lens during a blink will be time-dependent. The effects of the geometry of the contact lens and that of the parameters describing the geometry of the eye, the eyelids and the interaction of the eye with the contact lens on the transient position and the transient orientation of contact lenses can be investigated with the mathematical model described herein. For example, a proposed design can be modeled to determine how the forces acting on the lens and motion of the lens will occur. With this understanding design modifications can be considered and remodeled to determine whether desirable performance in this regard can be attained. This is especially useful in the process of designing lenses that need to be stabilized. The influence of the thick zones or stabilization zones on the final position, orientation and settling speed of the lens can be investigated iteratively or as an in silico in situ test prior to proceeding with production plans.

Figure 1A:
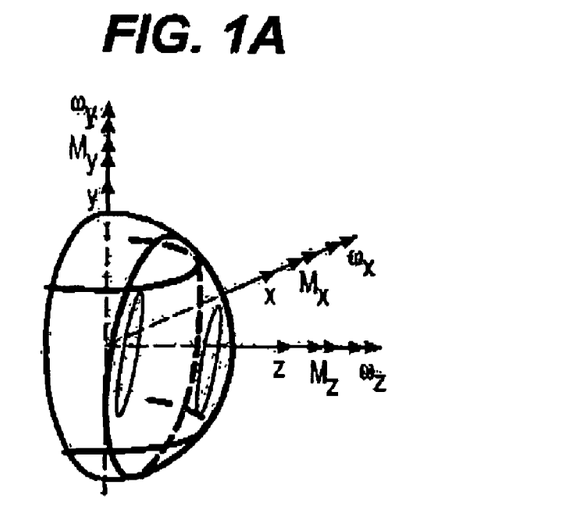
FIGS. 1A-C are schematic representations of an eye with an inserted lens that identify the axis of rotation and various torques acting at the lens.
Figure 1B:
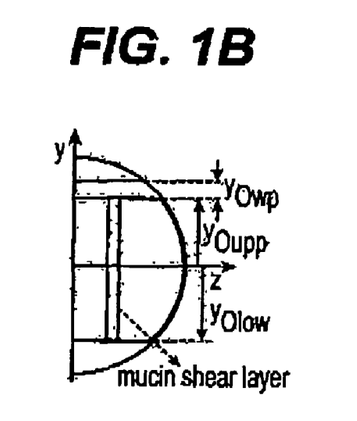
Figure 1C:
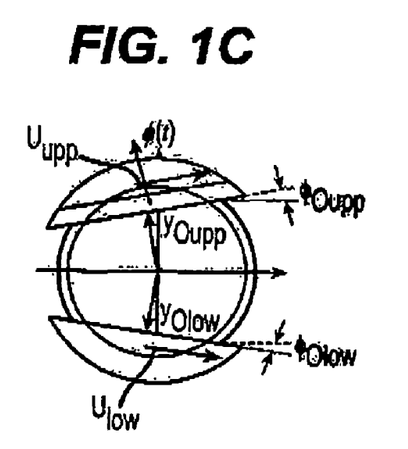

The parameters describing the geometry of the eye (cornea and sclera), base shape of the lens and the motion of the eyelids the eyelids are shown in FIG. 1. The motion of the lens follows from the balance of moment of momentum acting at the lens. Inertial effects are neglected. Then the sum of all moments acting at the lens is zero. Hence, $$\vec{0} = \vec{M}_{l,cor} + \vec{M}_{l,muc} + \vec{M}_{l,low} + \vec{M}_{l,upp} + \vec{M}_{l,Ulow} + \vec{M}_{l,Upp} + \vec{M}_{l,Vupp} + \vec{M}_{ms,low} + \vec{M}_{ms,upp} + \vec{M}_{elast} + \vec{M}_{grav}$$

The first four moments are resisting torques and are linearly dependent on the lens motion. The remaining torques are driving torques. This balance of moment of momentum results in a non-linear first order differential equation for the position β of the lens $$A(\vec{\beta}, t) \frac{d\vec{\beta}}{dt} = \vec{M}_{total}^{driving}(\vec{\beta}, t)$$

In the most preferred algorithm used in the inventive process, this equation is solved with a fourth order Runge-Kutta integration scheme. The positions of points on the contact lens follow from a rotation around the rotation vector β(t).

The rotation matrix R(t) transforming the old position of points to the current position follows from Rodrigues's formula $$\vec{x}_{new} = \vec{x}_{old} + \sin\beta(\vec{n} \times \vec{x}_{old}) + (1 - \cos\beta)(\vec{n} \times (\vec{n} \times \vec{x}_{old}))$$

$$\vec{x}_{new} = R(t)\vec{x}_{old}$$

where $\vec{n} = \frac{\vec{\beta}}{|\vec{\beta}|}$ and $\beta = |\vec{\beta}|$.

This numerical integration method uses a time-discretization and the motion of the lens can be seen as a number of subsequent rotations, hence at the next time step $t_{n+1}$ the rotation matrix is $$R_{n+1} \times R_{\Delta t} R_n$$

where $R_{\Delta t}$ is the rotation during the time step Δt.

The rotation matrix is decomposed into a rotation $R_\alpha$ and a decentration $R_\theta$ of the lens $$R(t) = R_\theta(t) R_\alpha(t)$$

The rotation of the lens is a rotation around the centerline of the lens. The decentration is a rotation around a line in the (x, y) plane. Hence, the position of the lens is seen as a rotation a of the lens around its centerline followed by a decentration $\vec{\theta}$.

By lens rotation is meant the angular movement of the lens around its z-axis occurring during and in between blinks. Rotation may be clockwise or counter clockwise depending on the initial position of the lens on the eye or the lens behavior when modeled on the eye.

By lens centration is meant the distance between the lens geometric center and the corneal apex. Centration is recorded in an x-y coordinate system in the plane of the corneal apex.

This model is best embodied in computer code such as MatLab, BASIC, FORTRAN, C++, or any other language from which commands can be executed in a computer, including a general purpose computer. Preferably, the model is implemented in MatLab computer code. The code is best reduced to several subroutines in separate MatLab (*.m) files. Input parameters are supplied in a comma separated (*.csv) file. The program can be made to run in interactive or batch mode. Output is best written to ASCII text and comma separated (*.csv) output files.

Of course, the program is given an appropriate name and the execution begins with entry of the name of the main program. For example, a command such as: run_lens_pos_BEP_csv can be entered, in a MatLab window or an executable such as run_lens_pos_BEP_csv_exec.exe. can be given. It is possible to configure different processing modes such as interactive and batch processing and an appropriate window can be made to provide the user a choice of modes.

Input files containing default values of input parameters are preferably presented in a pop-up window for processing or editing. The path of the default input file can be set to a subdirectory appropriately labeled such as "input". Files with an appropriate extension relating to this function are preferably the only ones displayed, for example, *.csv. A button next to a field such as Input file can be established so that a list of available *.csv input files are displayed. An input file can be selected by clicking on the file. For example, commands such as "ok" can be shown to enable a definitive choice of the input value and a command such as "reset" can allow the return to the original default input values.

The input parameters can be changed after selecting an input file containing default parameters; therefore three windows pop up in which these input parameters can be changed. In the first window the buttons ok and reset can be made to appear. The actions behind these buttons are the same as discussed above. Preferably, in the first window to change values of input parameters tear film properties, eye dimensions and lens properties are displayed and can be changed. In the second window to change values of input parameters the eyelid and blink properties, the gaze directions, initial position and gravity acceleration are preferably displayed and can be changed. In the third window to change values of input parameters the numerical parameters and output file are preferably displayed and can be changed.

When values have been assigned to the input parameters they are processed through the algorithm described above as appropriately coded according to programming techniques known in the art. Calculations are performed according to the algorithm. After all calculations have been carried out post processing can be activated. Further commands such as Start post-processing of results and End of program and close all figures can be used to engage subroutines to prepare data outputs and then stop further calculations and provide the output written to appropriate files such as an ASCII (*.txt) file and to a comma separated (*.csv) file. Optionally, post processing subroutines can be established as follows:

Lens decentration+orientation: graphs are made to display the decentration and rotation of the lens, Torques around x-axis: graphs are made of the driving and resisting torques around the x-axis acting at the lens Torques around y-axis: graphs are made of the driving and resisting torques around the y-axis acting at the lens Torques around z-axis: graphs are made of the driving and resisting torques around the z-axis acting at the lens Lens thickness: a 2D color map and 3D height plot are made of the lens thickness Elastic restoring Torque: graphs are made of the elastic energy content of the lens and the elastic restoring torque for different positions of the lens on the eye Create lens design summary: a summary of the lens design is made. Plots of the thickness distribution are made and data describing the global geometry of the lens are displayed.

Create PDF analysis summary (Vert.): a summary of the analysis results are displayed and stored into a PDF file. Plots of the rotation and decentration and information about the motion of the lens are given. All information is stacked vertically.

Create PDF analysis summary (Hor.): a summary of the analysis results are displayed and stored into a PDF file. Plots of the rotation and decentration and information about the motion of the lens are given. The information is put next to each other and/or stacked vertically.

Create movie of lens movement on eye: a movie is created of the lens motion on the eye. At each time step the lens is displayed and stored into an *.avi file at the folder: C:\Temporary. The user has to take care that the avi file is moved to a desired folder or that the file is renamed to avoid unwanted overwriting of the file.

Eye geometry summary: A summary of the eye geometry is displayed. Plots of the eye and other information are given. The displayed information is stored into a PDF or png file, dependent on the memory used on the computer.

Variable [Time/cycle number]: the variable along the x-axis of time dependent plots is toggled from time to cycle number or reverse.

Figure 2:
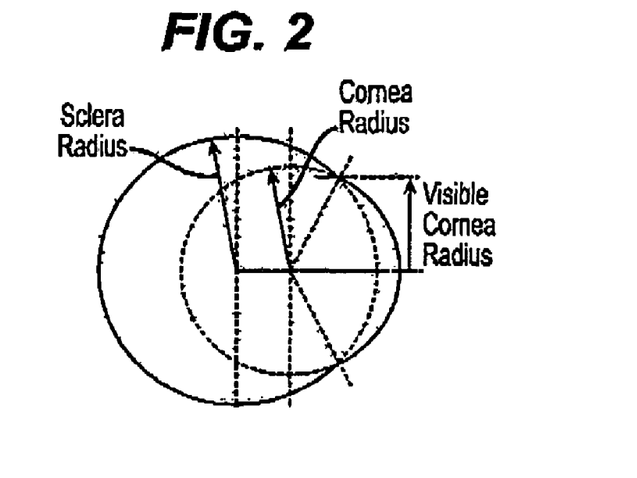
FIG. 2 is a representation of eye dimensions that can be used in computer modeling.
Figure 3:
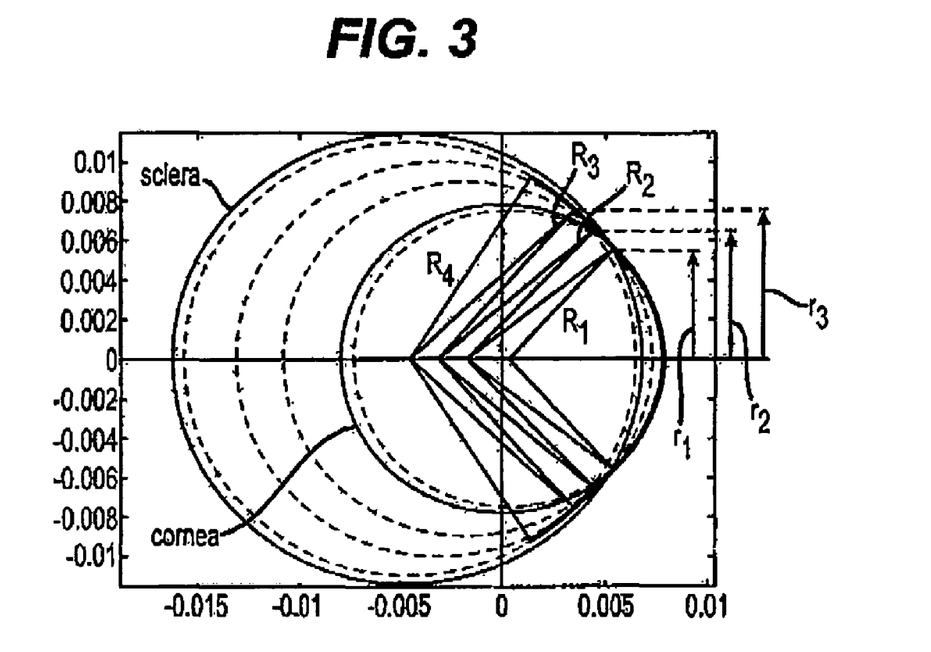
FIG. 3 is a representation of lens design features that can be used in computer modeling.
Figure 4A:
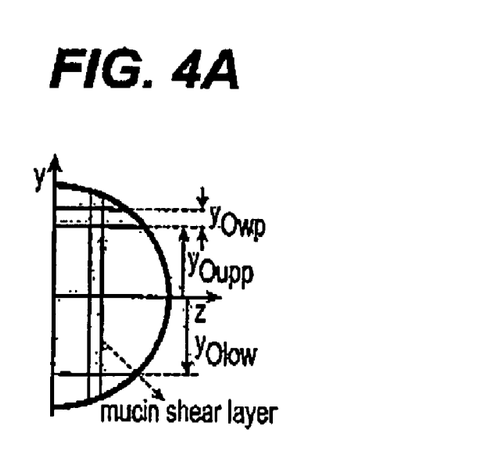
FIGS. 4A-B are representations of blink and blinking dimensions.
Figure 4B:
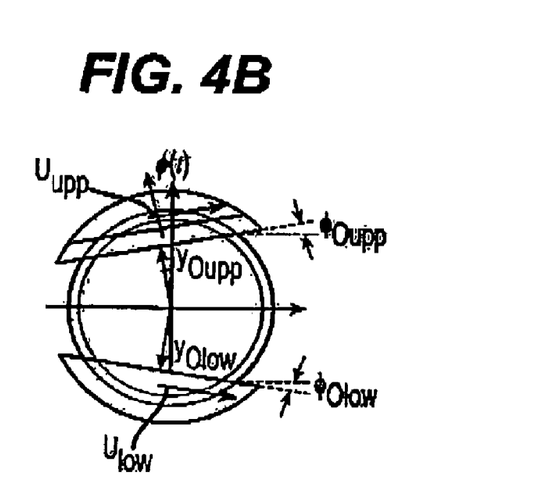

The simulation model parameters can be grouped into 7 groups of parameters. In each group the following parameters should preferably be assigned as follows:

Tear Film Properties:
a. aqueous layer (tear film) viscosity
b. mucin layer viscosity
c. mucin layer thickness
d. pre-lens tear film thickness
e. post-lens tear film thickness Eye Dimensions (FIG. 2)
a. radius of cornea
b. radius of sclera
c. radius of visible area of cornea Lens Design (FIG. 3)
a. lens base curve radii (r3)
b. transition radii of lens base curve radii (r2)
c. Lens Back Geometry (containing information about the undeformed lens geometry) (r1)
d. angle defining area of mucin shear layer (contact angle edge)
e. size contact area of mucin shear layer (contact area lens edge)
f. lens thickness (as a distribution given by a point cloud)

Lens Material Properties
a. density
b. Young's modulus
c. Poisson's ratio

Eyelid and Blink Properties
a. lower eyelid lateral displacement
b. upper eyelid lateral displacement
c. time to complete downward motion upper eyelid
d. time to complete blink
e. time between one blink and the next one
f. eyelid pressure p [N/m^2];
g. lower eyelid position at start of blink
h. upper eyelid position at start of blink
i. width pressure band at upper eyelid edge
j. angle lower eyelid at start of blink
k. angle upper eyelid at start of blink
l. velocity eyelids constant/matching experiments Gaze Direction
a. choice in predefined transient gaze directions
b. no change in gaze direction
c. horizontal
d. vertical motion
e. circular motion
f. constant gaze in horizontal direction
g. constant gaze in vertical direction
h. amplitude periodic gaze motion
i. frequency periodic gaze motion Initial Values
a. initial rotation angle lens
b. initial decentration in x-direction
c. initial decentration in y-direction Gravity Acceleration
gravity acceleration (m2/s)

Simulation Parameters
a. number of cycles that has to be simulated
b. number of time steps in [0,Tdownblink]
c. specified time step
d. discretisation lens in radial direction
e. discretisation lens in circumferential direction Output files (e.g., in both *.txt and *.csv format) are generated during and after processing for each configuration. That is, intermediate and final results are both prepared. Intermediate results preferably include:

a. time duration of a cycle: blink+pause between blinks
b. lens half diameter
c. mass of lens
d. x-coordinate of center of mass
e. y-coordinate of center of mass
e. z-coordinate of center of mass
f. width of mucin shear layer at the end of the blinks. Furthermore, the minimum and maximum values of the first four quantities during the last cycle are written to the file. A negative sign is added to the offset if the offset is in the positive y plane. A positive sign is used if the offset is in the negative y plane.

Example of MS-Excel Summary Output File:

| | | | | | | |
|---|---|---|---|---|---|---|
| x [mm] | Blink | 0 | 1 | 2 | 3 | 4 |
| | Time | 0 | 3.258 | 6.516 | 9.774 | 13.032 |
| | Config #1 | 0 | 0.000195 | −0.00256 | −0.00268 | −0.00208 |
| | Config #2 | 0 | −0.00172 | −0.00164 | −0.00109 | 8.71E−05 |
| | Config #3 | 0 | −0.00309 | −0.0014 | −0.00329 | −0.00343 |
| y [mm] | Blink | 0 | 1 | 2 | 3 | 4 |
| | Time | 0 | 3.258 | 6.516 | 9.774 | 13.032 |
| | Config #1 | 0 | −0.03102 | −0.0271 | −0.02796 | −0.03178 |
| | Config #2 | 0 | −0.03264 | −0.03064 | −0.03107 | −0.03121 |
| | Config #3 | 0 | −0.01922 | −0.01682 | −0.01829 | −0.01593 |
| alpha [deg.] | Blink | 0 | 1 | 2 | 3 | 4 |
| | Time | 0 | 3.258 | 6.516 | 9.774 | 13.032 |
| | Config #1 | 0 | −0.22329 | −0.4598 | −0.6383 | −0.88067 |
| | Config #2 | 0 | −0.38557 | −0.72761 | −1.17436 | −1.70341 |
| | Config #3 | 0 | −0.31919 | −0.74006 | −1.14904 | −1.51902 |
| Offset [mm] | Blink | 0 | 1 | 2 | 3 | 4 |
| | Time | 0 | 3.258 | 6.516 | 9.774 | 13.032 |
| | Config #1 | 0 | 0.031023 | 0.027217 | 0.028085 | 0.031849 |
| | Config #2 | 0 | 0.032682 | 0.030684 | 0.031087 | 0.031213 |
| | Config #3 | 0 | 0.019464 | 0.016878 | 0.01858 | 0.016292 |
| dalpha/dt | Blink | 0 | 1 | 2 | 3 | 4 |
| | Time | 0 | 3.258 | 6.516 | 9.774 | 13.032 |
| | Config #1 | −0.05428 | −0.07668 | −0.06239 | −0.05589 | −0.10161 |
| | Config #2 | −0.14456 | −0.1019 | −0.11784 | −0.15309 | −0.16835 |
| | Config #3 | −0.06853 | −0.12049 | −0.13095 | −0.11983 | −0.10701 |

| | Config #1 | Config #2 | Config #3 |
|---|---|---|---|
| X_min [mm] | −0.41162 | −0.42392 | −0.47034 |
| Y_min [mm] | −1.66197 | −1.62902 | −1.6638 |
| Angle_min [Deg] | −1.20979 | −1.8139 | −1.65535 |
| Offset_min [mm] | −1.70955 | −1.69147 | −1.74815 |
| X_max [mm] | 0.51274 | 0.555146 | 0.580152 |
| Y_max [mm] | 0.733394 | 0.728233 | 0.850322 |
| Angle_max [Deg] | −0.63789 | −1.17436 | −1.14904 |
| Offset_max [mm] | 0.825573 | 0.827141 | 0.953479 | g. fit coefficients of x-component elastic restoring torque as a function of x-components of decentration angle
h. fit coefficients of x-component elastic restoring torque as a function of components of decentration angle Final results preferably include:
a. Position, rotation angle and x-y offset both at the start and at the end of the last cycle
b. x-y offset and rotation angle with respect to the end position, hence the difference in x-y offset, respectively in rotation angle, between the values at the start and at the end of the last cycle.
c. Maximum and minimum values of the x-y position, rotation angle and x-y offset with respect to the end position
d. Position and rotation angle of lens when x-y offset lens reaches an extreme value
e. Values of time, (x,y,z)-position, rotation angle, x-y offset, x-y offset w.r.t. end position, rotation angle w.r.t. end value and the rotation speed at the start of each cycle (blink) and at the end of the last cycle In a preferred embodiment of the invention, outputs populate a spread sheet file such as a Microsoft Excel file (a summary of the position and the rotation speed of the lens are written for all configurations in the batch file. For each cycle, the x, y position of the apex of the lens, the rotation angle, the offset, the rotation speed are written to the file at the start and The lenses of the invention may be made from any suitable lens forming materials for manufacturing ophthalmic lenses including, without limitation, spectacle, contact, and intraocular lenses. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

Curing of the lens material may be carried out by any convenient method. For example, the material may be deposited within a mold and cured by thermal, irradiation, chemical, electromagnetic radiation curing and the like and combinations thereof. Preferably, for contact lens embodiments, molding is carried out using ultraviolet light or using the full spectrum of visible light. More specifically, the precise conditions suitable for curing the lens material will depend on the material selected and the lens to be formed. Suitable processes are disclosed in U.S. Pat. No. 5,540,410 incorporated herein in its entirety by reference.

The contact lenses of the invention may be produced by any convenient method. One such method uses an OPTO- FORM™ lathe with a VARIFORM™ attachment to produce mold inserts. The mold inserts in turn are used to form molds. Subsequently, a suitable liquid resin is placed between the molds followed by compression and curing of the resin to form the lenses of the invention. One ordinarily skilled in the art will recognize that any number of known methods may be used to produce the lenses of the invention.

The invention will now be further described with respect to the following non-limiting example.

EXAMPLE 1

Figure 5:
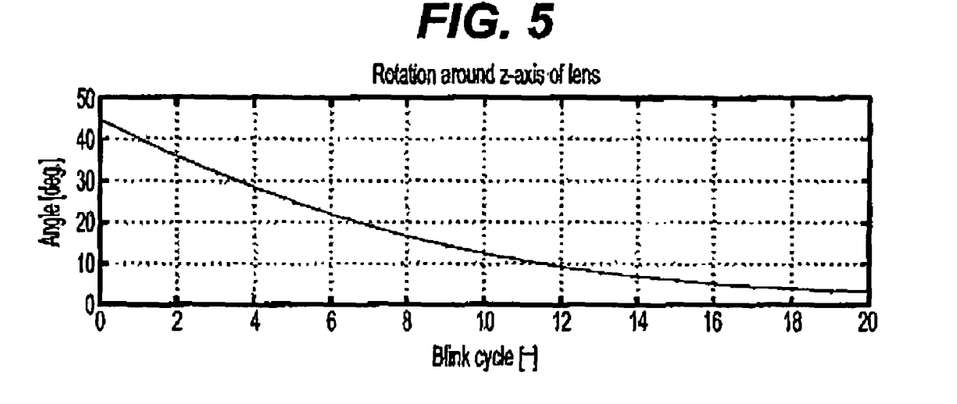
FIG. 5 is the response in rotation of a −3.00D Silicone Hydrogel lens for astigmatism.

The lens design described in example 1 is a commercially available silicone hydrogel lens (ACUVUE OASYS, Johnson & Johnson Vision Care, Inc.) for astigmatism for a −3.00D prescription. The lens was modeled in the previously described eye model using 20 blink cycles. The lens was intentionally misaligned by 45 degrees counter clockwise for the starting position. FIG. 5 represents the response in rotation of the lens obtained from the eye model. The response in rotation shows the lens rotating back toward its resting position. The resting position is reached after about 16 blinks where the lens rotation is within 5.0 degrees from the final position assumed to be 0.0 degree.

Figure 6:
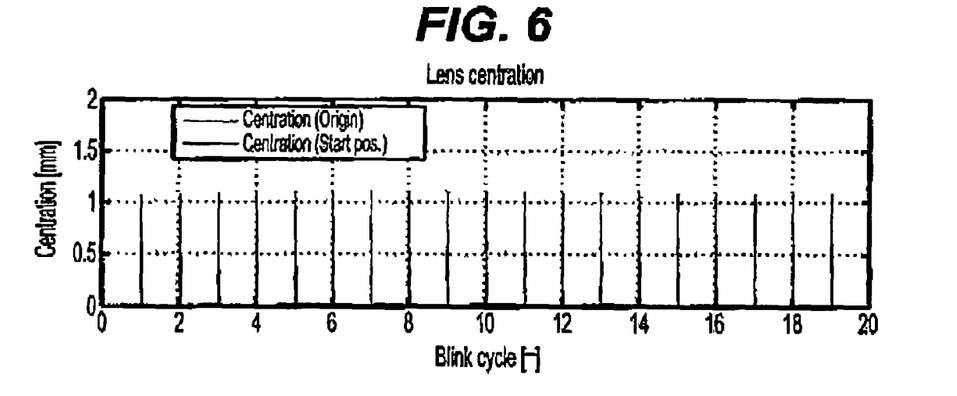
FIG. 6 is the response in centration of a −3.00D Silicone Hydrogel lens for astigmatism.
Figure 7:
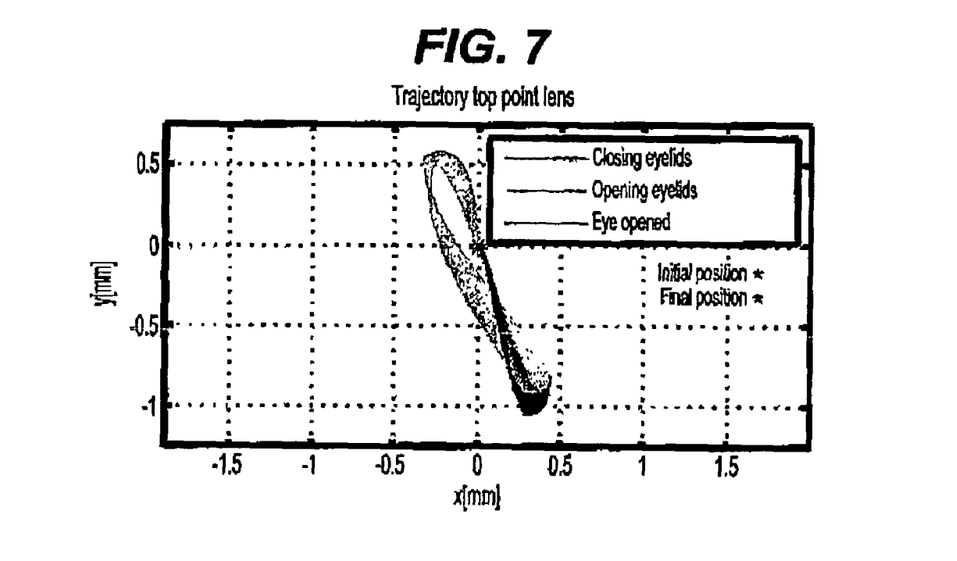
FIG. 7 is the on-eye movement of a −3.00D Silicone Hydrogel lens for astigmatism.

FIG. 6 represents the response in centration of the lens from example 1. The lens decenters up to 1.00 mm within each blink. More details on the lens centration are provided in FIG. 7 where lens movement is segmented into three distinctive movements:

Downward movement occurring during the closing of the eyelids

Upward movement occurring during the opening of the eyelids

Remaining lens movement occurring during two consecutive blinks

We claim:

1. A method for designing and fabricating a contact lens, the method comprising the steps of:
    (a) constructing a virtual dynamic lens-on-eye model, the model comprising the topography measurements of the cornea and the sclera, the shape, tension and movement characteristics of both the upper and lower eyelids, and the geometry of the contact lens design, including its thickness profile in all directions;
    (b) simulating blinking motion of the upper and lower eyelids in the virtual dynamic lens-on-eye model over at least one blink cycle;
    (c) calculating rotation and decentration data for the contact lens of the virtual dynamic lens-on-eye model induced by the simulated blinking motion;
    (d) modifying the geometry of the contact lens design to optimize the fit of the contact lens on the eye based upon the rotation and position of the contact lens on the eye of the virtual dynamic lens-on-eye model;
    (e) repeating steps (b)-(d) until the fit of the lens on the eye is optimized and a corresponding set of contact lens design parameters are generated; and
    (f) fabricating a contact lens based on the optimal design parameters.

* * * * *